US 012174516B2

(12) United States Patent
Gwalani

(10) Patent No.: US 12,174,516 B2
(45) Date of Patent: Dec. 24, 2024

(54) FILTER MOUNTING DEVICE FOR A CAMERA

(71) Applicant: FREEWELL INDUSTRY COMPANY LIMITED, Hong Kong (HK)

(72) Inventor: Hitesh Gopal Gwalani, Nagpur (IN)

(73) Assignee: FREEWELL INDUSTRY COMPANY LIMITED, Hong Kong (HK)

( * ) Notice: Subject to any disclaimer, the term of this patent is extended or adjusted under 35 U.S.C. 154(b) by 531 days.

(21) Appl. No.: 17/583,229

(22) Filed: Jan. 25, 2022

(65) Prior Publication Data

US 2022/0146911 A1    May 12, 2022

(51) Int. Cl.
*G03B 17/12*    (2021.01)
(52) U.S. Cl.
CPC .................... *G03B 17/12* (2013.01)
(58) Field of Classification Search
None
See application file for complete search history.

(56) References Cited

U.S. PATENT DOCUMENTS

| | | | |
|---|---|---|---|
| 11,448,940 B1* | 9/2022 | Clark | G02B 7/006 |
| 2018/0266659 A1* | 9/2018 | Ho | G03B 17/565 |
| 2018/0348467 A1* | 12/2018 | Leung | G02B 7/006 |
| 2020/0183255 A1* | 6/2020 | Gwalani | G02B 7/022 |
| 2021/0382373 A1* | 12/2021 | Zeng | G03B 17/566 |

* cited by examiner

*Primary Examiner* — Robert E. Tallman

(57) ABSTRACT

A filter mounting device for a camera. The device comprises a first filter, a second filter, a third filter and a holder assembly. The periphery of the first filter and the third filter has circular configurations with different dimensions. The periphery of the second filter comprises a pair of first edges that are parallel to each other. The holder assembly comprises a frame configured to accommodate the plurality of filters. The frame comprises a first filter receiving portion and a second filter receiving portion. The first filter receiving portion is configured to receive the first filter. The second filter receiving portion is configured to receive the second filter via a first slot. The first slot is defined on the frame along a direction perpendicular to a vertical axis of the frame.

19 Claims, 12 Drawing Sheets

FILTER MOUNTING DEVICE FOR A CAMERA

FIELD OF INVENTION

The subject matter in general relates to a technical field photographic equipment. More particularly, but not exclusively, the subject matter relates to a filter mounting device used to mount multiple filters onto a camera.

BACKGROUND

A clear photograph of an object under focus can be captured by using filters to eliminate unwanted light, color, and other features of the photograph to enhance the object of interest being photographed. For example, filters can be used to subdue the glares and reflections that might occur while capturing an image outside a studio set-up dedicated for photography. Some filters can be used to enhance a certain color of interest in an image being captured, while other filters can be used to eliminate certain amount of light in the background of an image being captured or increase the field of view of the camera and so on.

Although, software can be used for editing photographs, the software can only manipulate an already captured image, but not what a sensor in the camera sees even before capturing the image. Therefore, the use of filters while capturing an image renders an enhanced photograph of the image of interest.

The current technology used for filters in photography, involve using circular filters with different diameters that are engaged onto the camera lens. The filters with different diameters can be used either separately or in combination with each other. Combining a plurality of filters provides more options for modifying even the minutest details of any image being captured, thereby improving the efficiency in the use of the filters in photography. Further, square filters are also used mainly as neutral density filters for neutralizing the density of light in the image being captured. Square and rectangular filters are made from glass or resin and are attached to the end of the camera lens using a separate lens holder.

However, the existing filter mounting devices are not configured to accommodate both circular and square or rectangular filters nor can they be used in combination with each other. The circular filters can be coupled on to the camera lens whereas the square or rectangular filter require a separate lens holder that needs to be attached to the camera before using the square filter or the rectangular filter. The conventional square lens holder has a circular projection on one side to screw on to the camera and a slot on the other side to hold the square or rectangular filter. The shape and dimension of the slot corresponds to the dimensions of the filter being used. In other words, a square filter has to be mounted with a lens holder having a square slot while a rectangular filter has to be mounted with another lens holder having a rectangular slot. The user is required to screw and unscrew attachments to the camera lens multiple times in order to use multiple filters. The engaging and disengaging of different types of filters is a cumbersome process and time consuming. Furthermore, frequent engagement and disengagement of the filters result in wear and tear of the lens of the camera.

In view of the foregoing discussion, there is a need to provide a single holder for holding different types of filters (circular and square filters), without the need for changing the attachment to the camera lens.

SUMMARY

An embodiment discloses a filter mounting device for a camera. The device includes a first filter, a second filter and a holder assembly. The periphery of the first filter has a circular configuration. The periphery of the second filter includes a pair of edges that are parallel to each other. The holder assembly includes a frame having a first filter receiving portion and a second filter receiving portion. The first filter receiving portion is configured to receive the first filter while the second filter receiving portion is configured to receive the second filter via a first slot. The first slot is defined on the frame along a direction perpendicular to a vertical axis of the frame.

BRIEF DESCRIPTION OF DIAGRAMS

Exemplary embodiments of the present invention will be understood and appreciated more fully from the following detailed description, taken in conjunction with the drawings in which, FIG. 1A illustrates an exploded view of filter mounting device 101 for a camera 102, in accordance with an embodiment;

Figure 6:
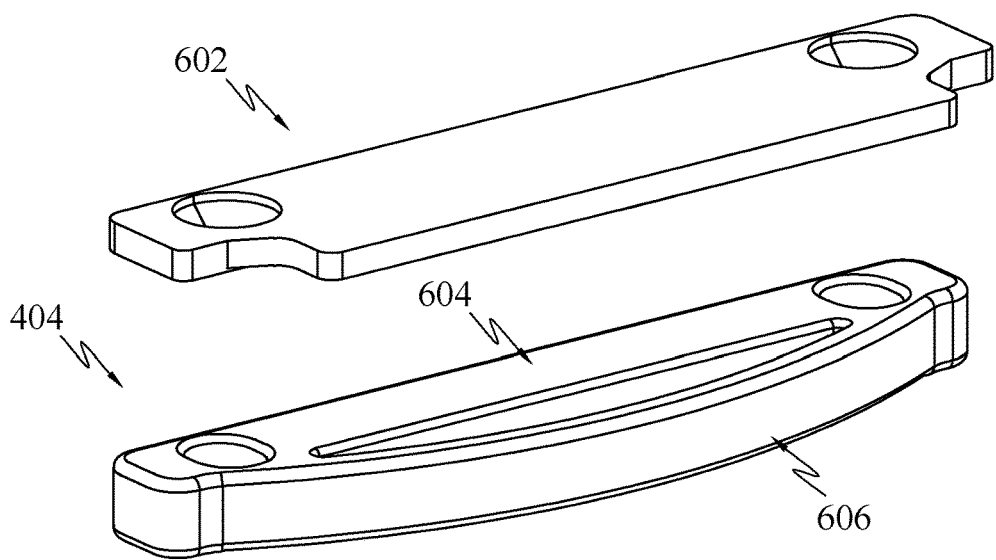
Figure 7A:
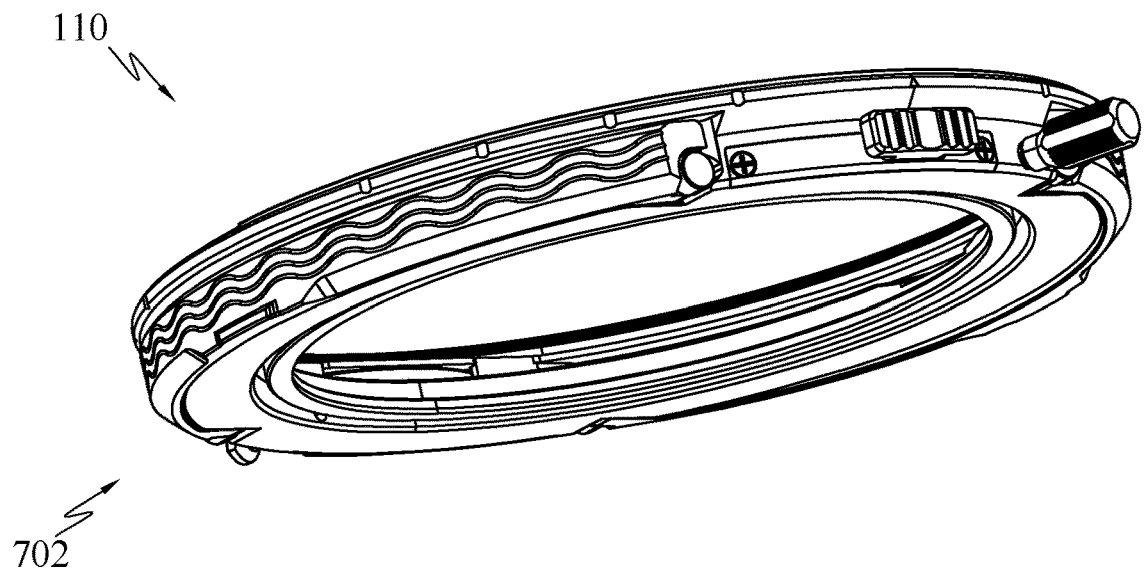
Figure 7B:
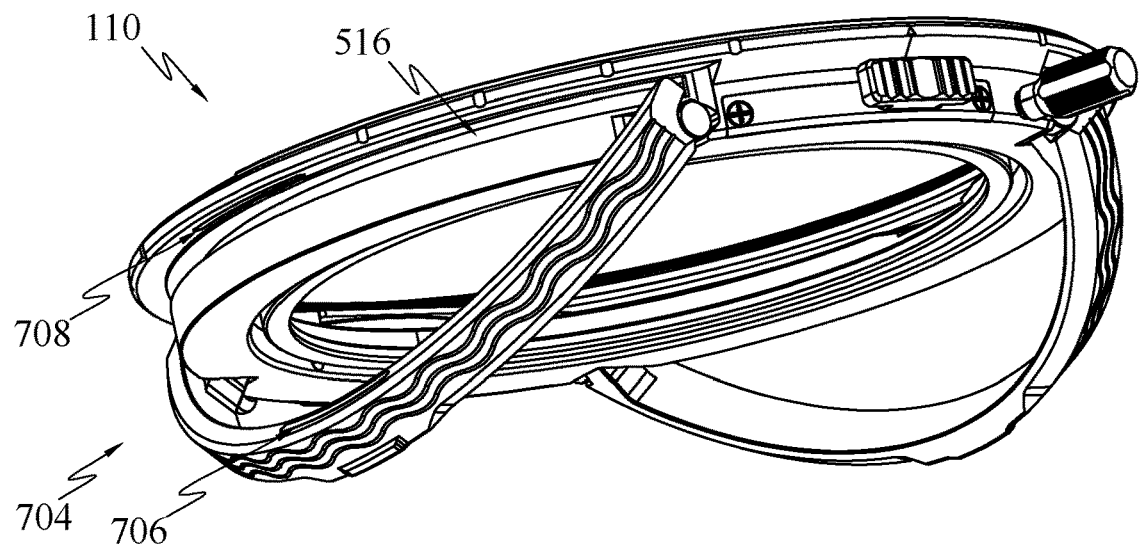
Figure 8A:
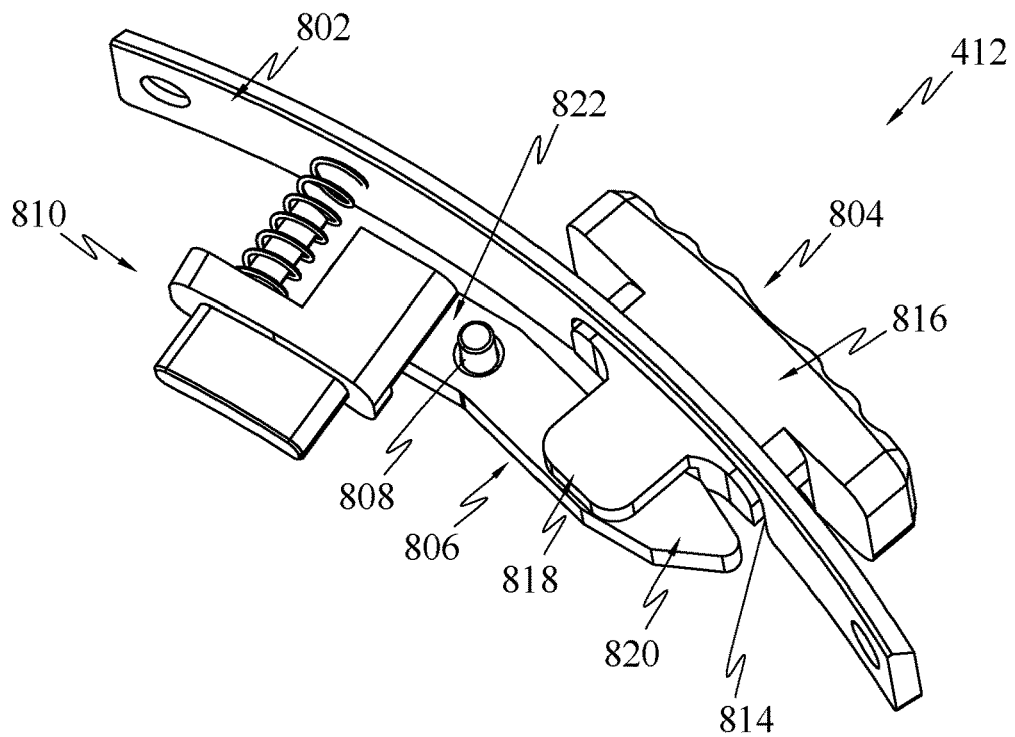
Figure 8B:
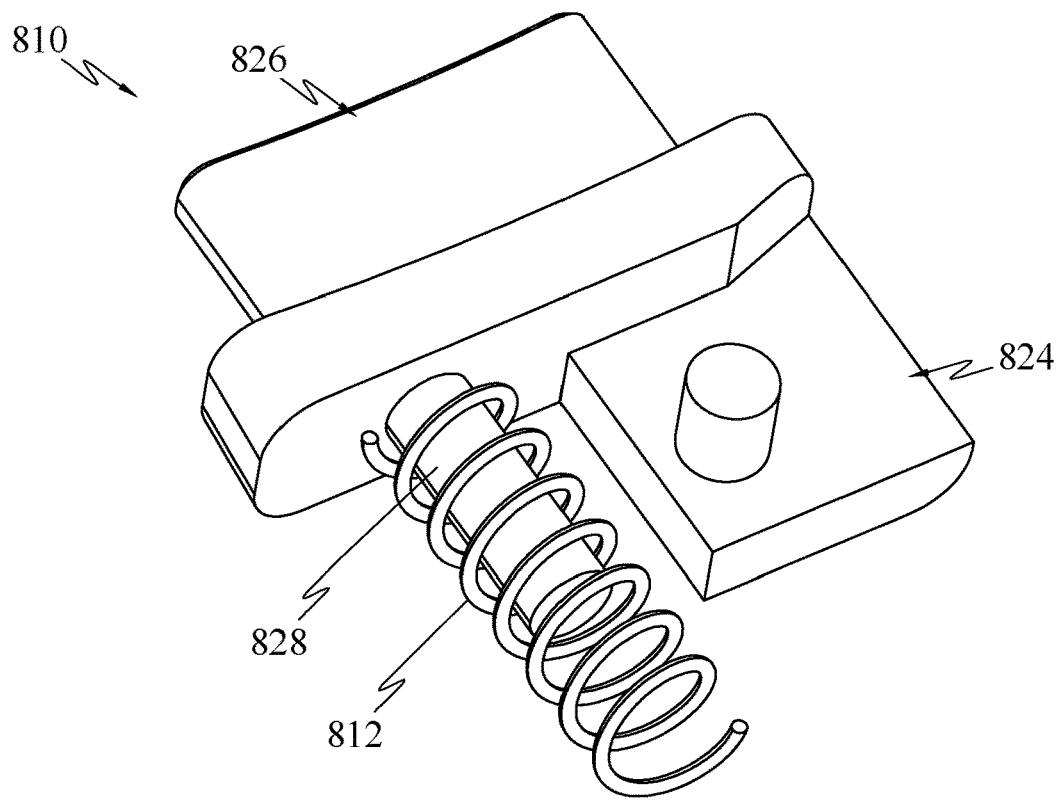
Figure 9:
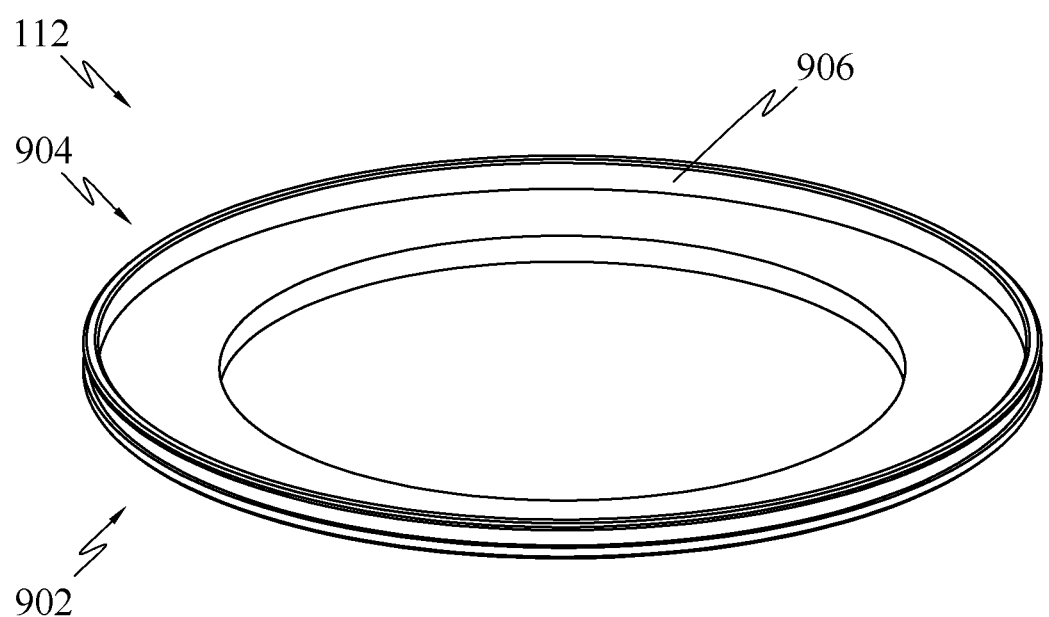
Figure 10:
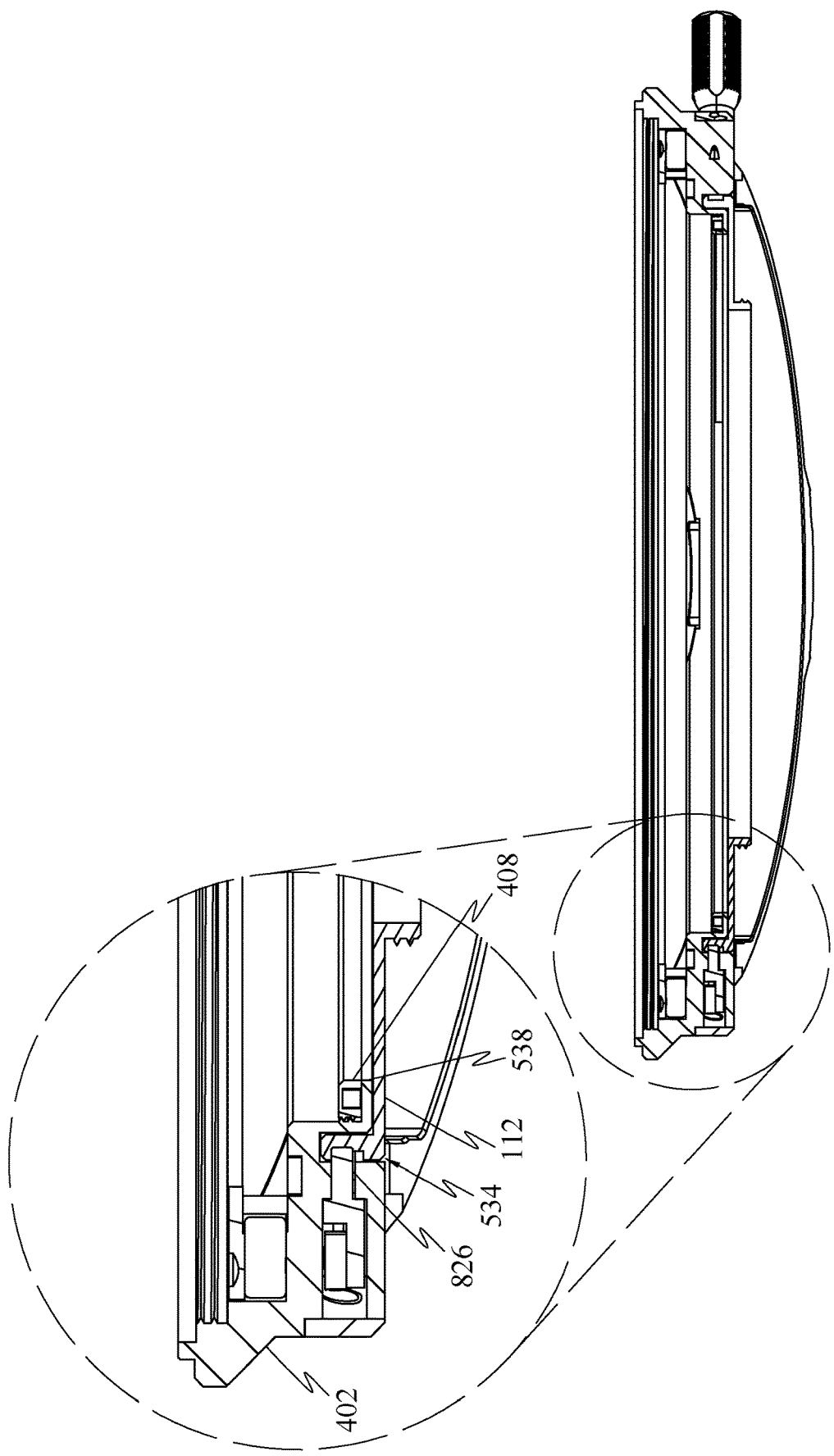
Figure 11:
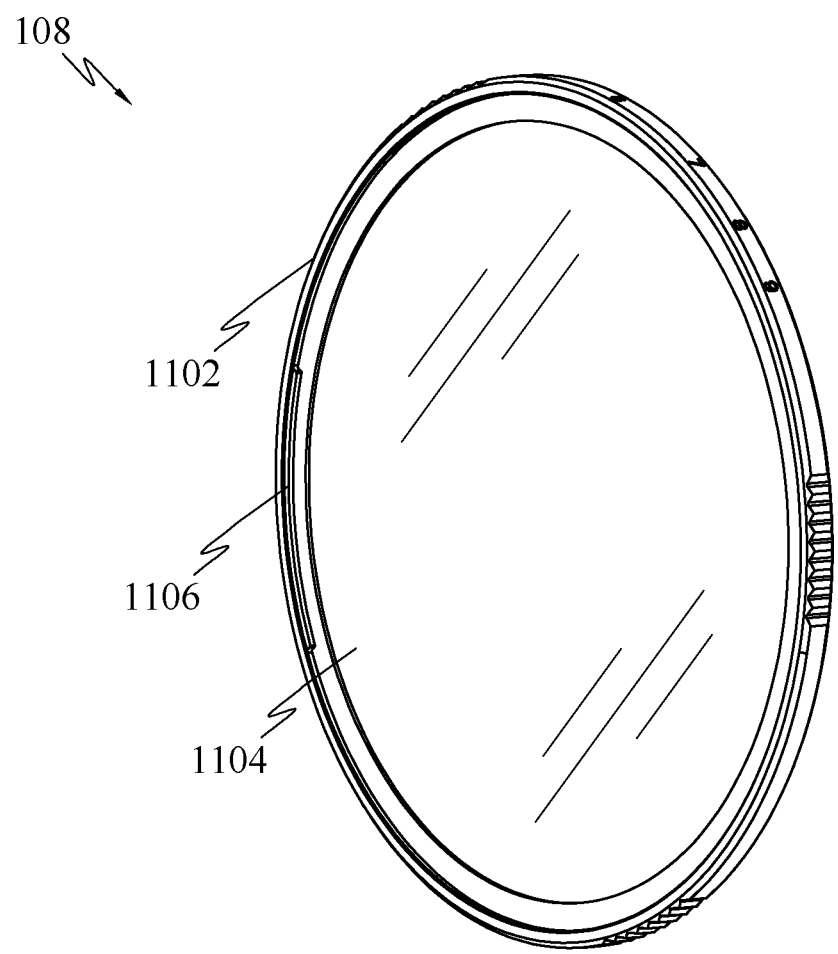
Figure 12A:
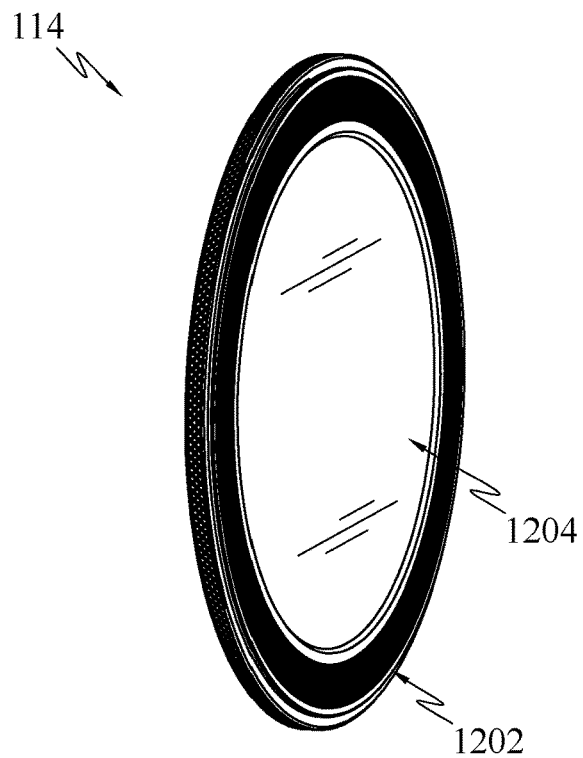
Figure 12B:
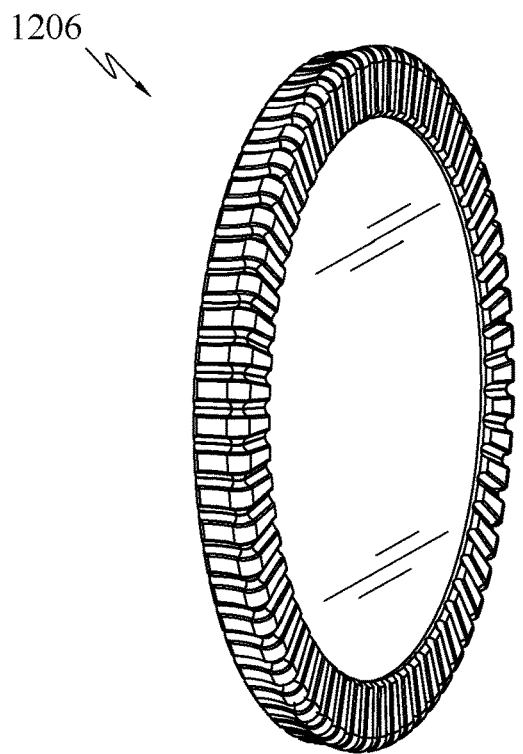

FIG. 6 illustrates a gripping member 404 with a reinforcing member 602 of the holder assembly 110, in accordance with an embodiment;

FIG. 7A illustrates the frame 402 with black-out members 406 disposed in a first position, in accordance with an embodiment;

FIG. 7B illustrates the frame 402 with black-out members 406 disposed in a second position, in accordance with an embodiment;

FIG. 8A illustrates a snapping mechanism 412 of the holder assembly 110, in accordance with an embodiment;

FIG. 8B illustrates a locking member 810 of the snapping mechanism 412, in accordance with an embodiment;

FIG. 9 illustrates a transfer ring 112, in accordance with an embodiment;

FIG. 10 illustrates a cross sectional view of the frame 402 and the transfer ring 112 assembly, in accordance with an embodiment;

FIG. 11 illustrates a third filter 108, in accordance with an embodiment;

FIG. 12A illustrates a second lens cover configuration, in accordance with an embodiment; and FIG. 12B illustrates a first lens cover configuration, in accordance with an embodiment.

DETAILED DESCRIPTION OF THE INVENTION

The following detailed description includes references to the accompanying drawings, which form part of the detailed description. The drawings show illustrations in accordance with example embodiments. The numerals in the figure represent like elements throughout the several views, exemplary embodiments of the present disclosure are described. For convenience, only some elements of the same group may be labelled with numerals. The purpose of the drawings is to describe exemplary embodiments and not for production. Therefore, features shown in the figures are chosen for convenience and clarity of presentation only. Further, the figures may be out of scale, as they are intended for conveying the concept to help understand the working. Moreover, the language used in this disclosure has been principally selected for readability and instructional purposes and may not have been selected to delineate or circumscribe the inventive subject matter, resort to the claims being necessary to determine such inventive subject matter. These example embodiments are described in enough details to enable those skilled in the art to practice the present subject matter. However, it will be apparent to one of ordinary skill in the art that the present invention may be practiced without these specific details. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "a or b" includes "a but not b," "b but not a," and "a and b," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
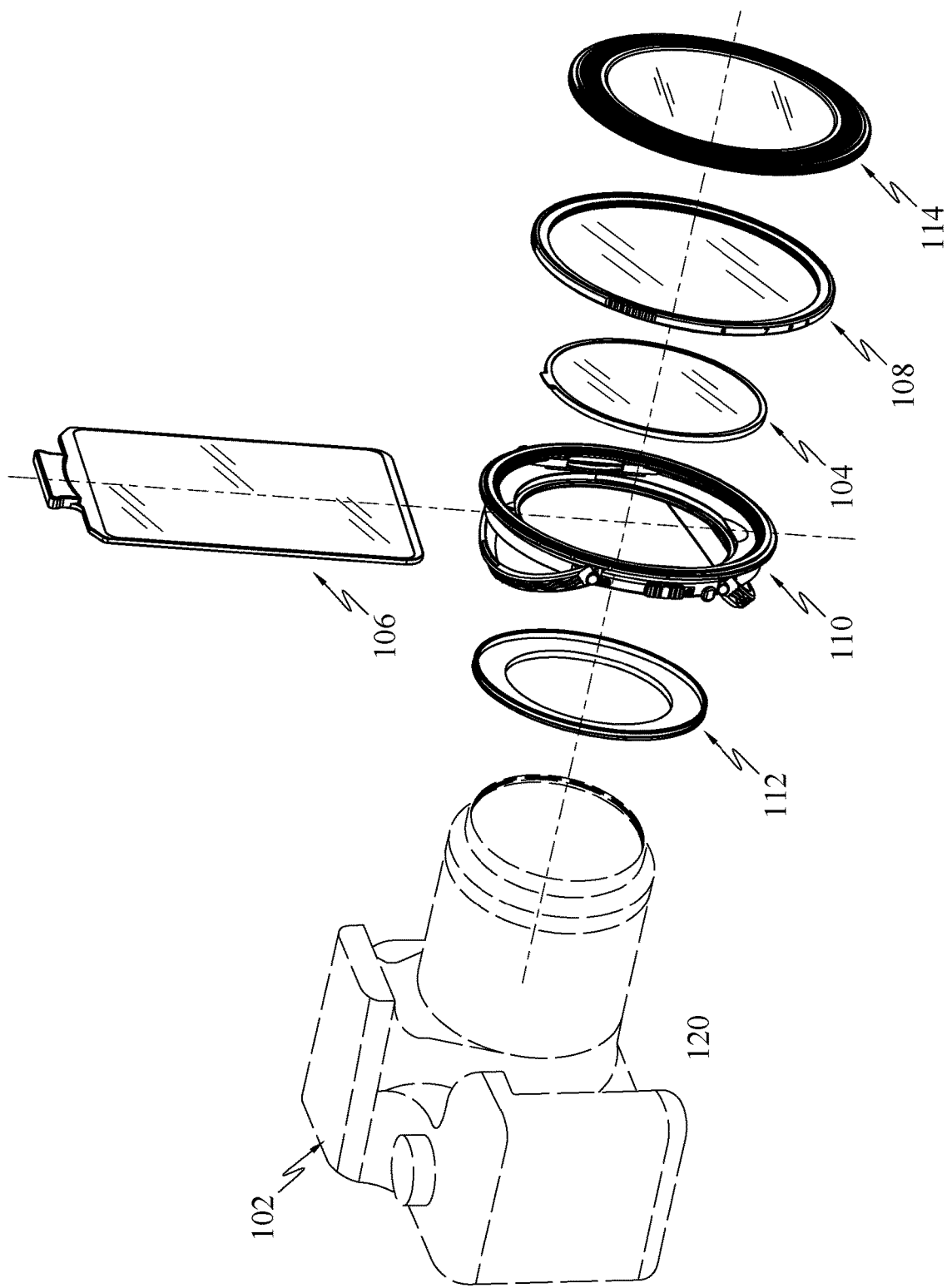
FIG. 1B illustrates an assembled view of the filter mounting device 101, in accordance with an embodiment.

FIG. 1A illustrates an exploded view of filter mounting device 101 for a camera 102, in accordance with an embodiment. The camera 102 may comprise a camera lens 120. The device 101 may comprise a first filter 104, a second filter 106, a third filter 108, a holder assembly 110, a transfer ring 112 and a second lens cover 114.

Figure 1B:
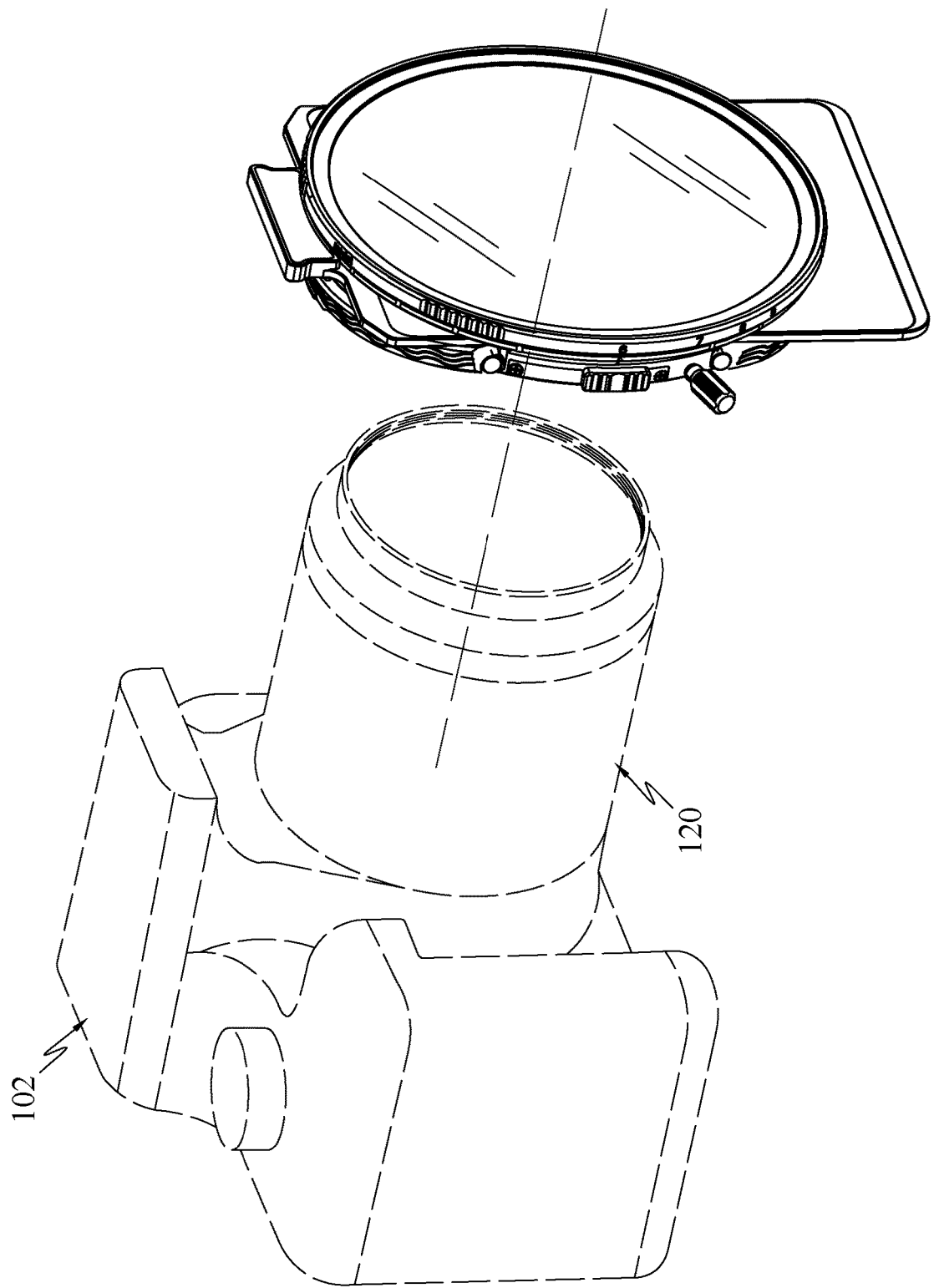

FIG. 1B illustrates an assembled view of the filter mounting device 101, in accordance with an embodiment.

Figure 2:
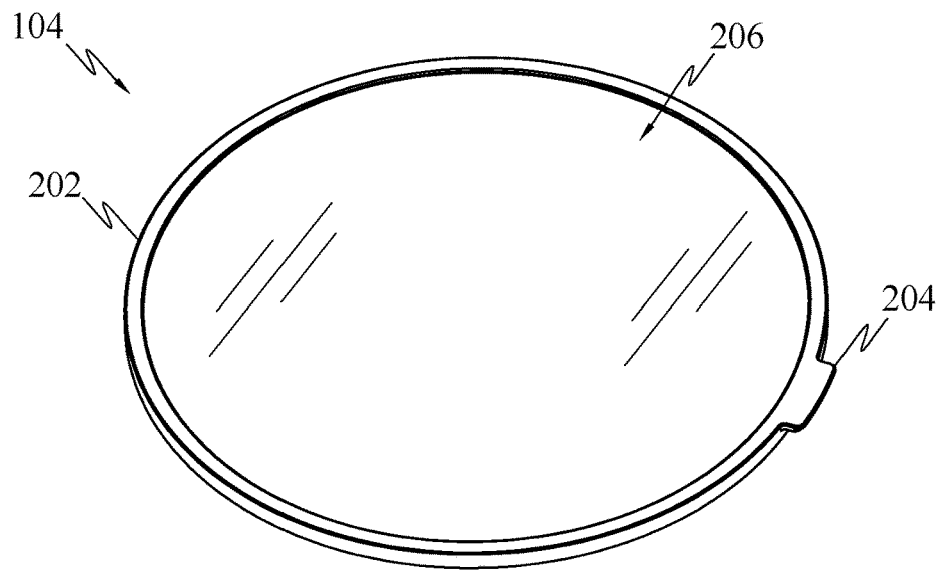
FIG. 2 illustrates a first filter 104, in accordance with an embodiment.

FIG. 2 illustrates a first filter 104, in accordance with an embodiment. The first filter 104 may comprise a first casing 202 forming a periphery of the first filter 104, a first protrusion 204 provided in a lateral direction and a first filtering material 206, wherein the periphery of the first filter 104 may have a circular configuration.

In an embodiment, the first casing 202 may be made using a ferromagnetic material. The ferromagnetic material may enable the first filter 104 to be magnetically coupled to the holder assembly 110.

Figure 3:
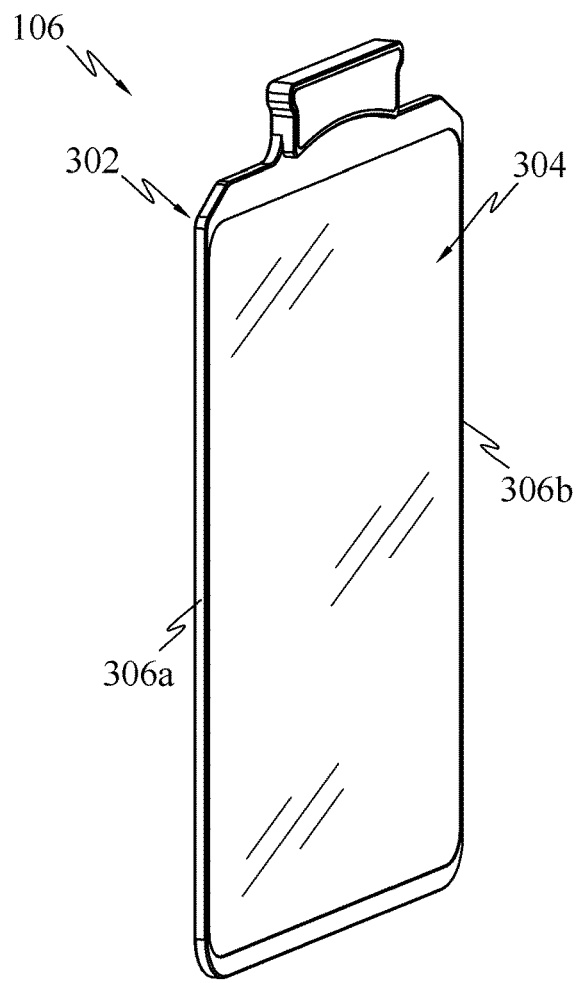
FIG. 3 illustrates a second filter 106, in accordance with an embodiment.

FIG. 3 illustrates a second filter 106, in accordance with an embodiment. The second filter 106 may comprise a second casing 302 forming the periphery of the second filter 106 and a second filtering material 304. The periphery of the second filter 106 may comprise a pair of first edges 306a and 306b along its length that may be parallel to each other.

In an embodiment, the second casing 302 may be made using a ferromagnetic material. The second ferromagnetic casing 302 may enable the second filter 106 to be magnetically coupled to the holder assembly 110.

Figure 4:
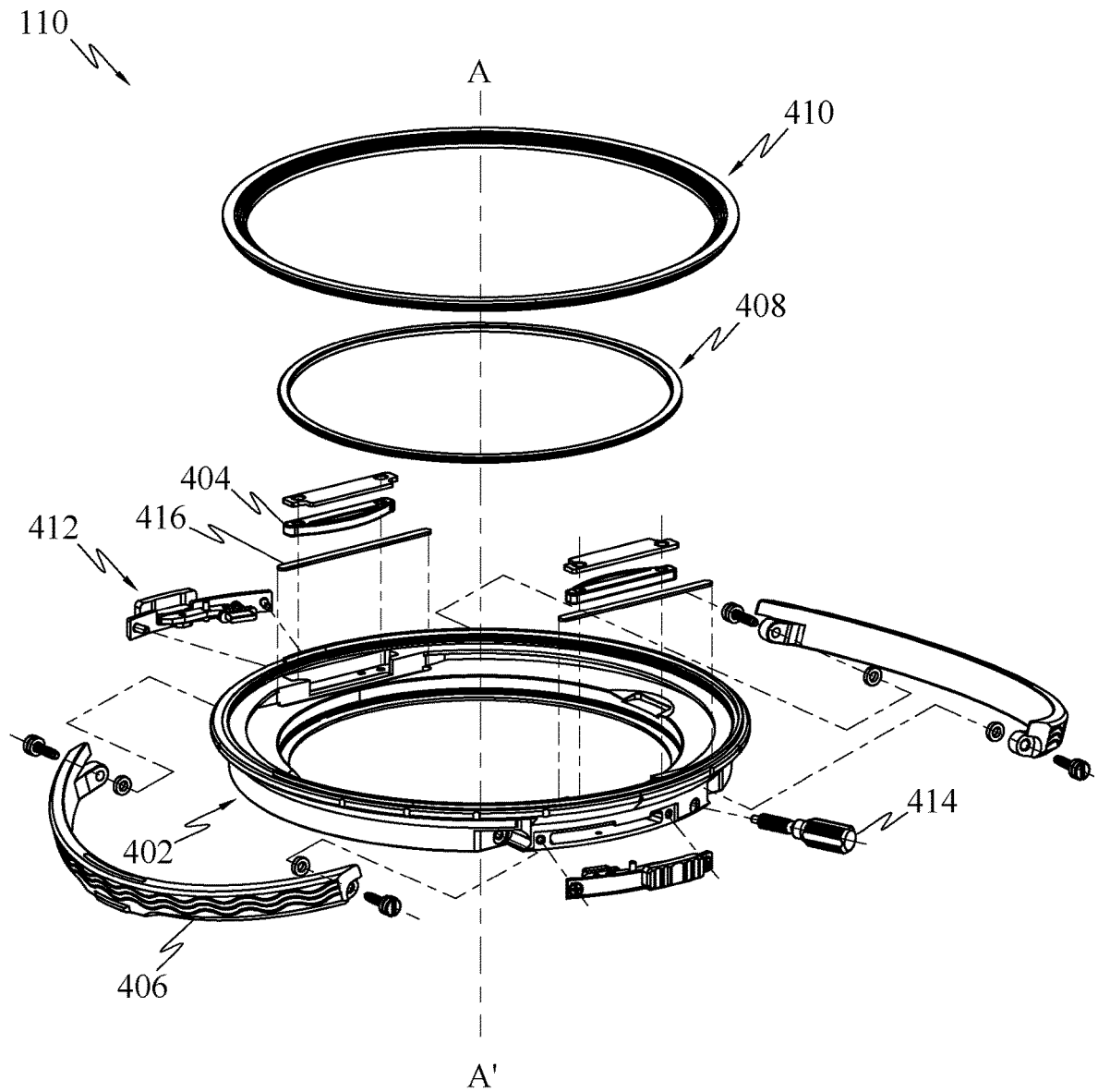
FIG. 4 illustrates an isometric exploded view of a holder assembly 110, in accordance with an embodiment.

Referring to FIG. 4, an isometric exploded view of the holder assembly 110 is disclosed, in accordance with an embodiment. The holder assembly 110 may comprise a frame 402, a pair of gripping members 404, a pair of black-out members 406, a first connecting ring 408, an adapter ring 410, a snapping mechanism 412, and a locking screw 414.

Figure 5A:
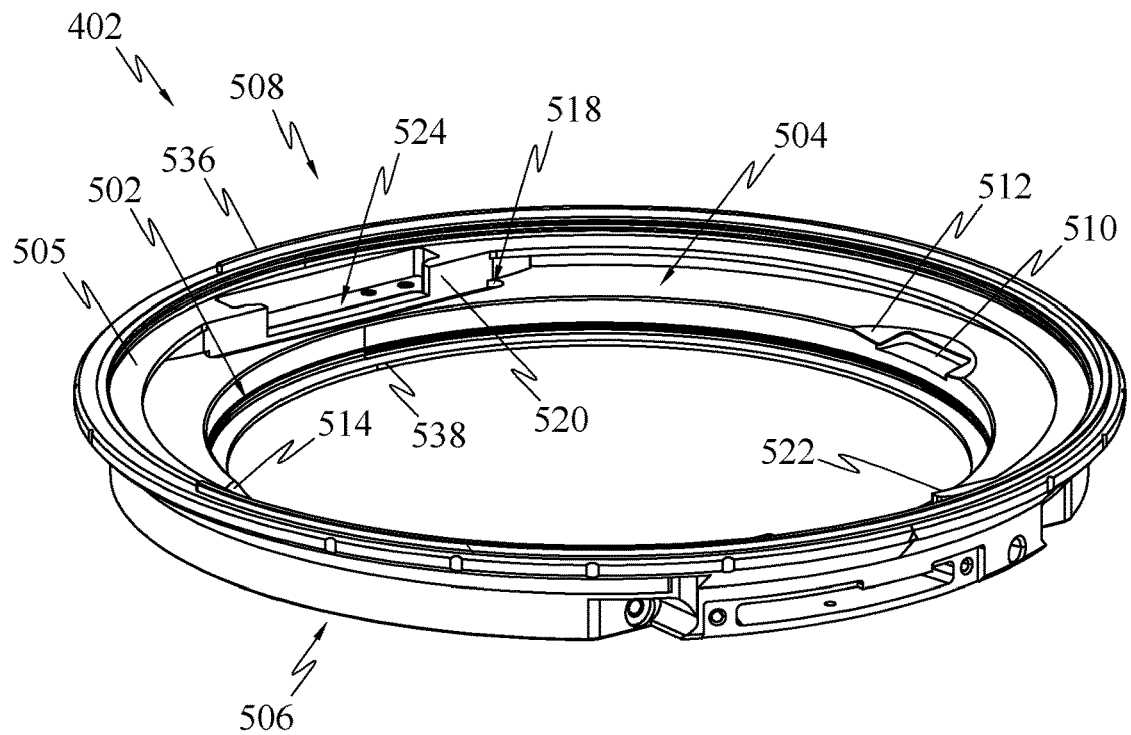
FIG. 5A illustrates a perspective view of a frame 402, in accordance with an embodiment.
Figure 5B:
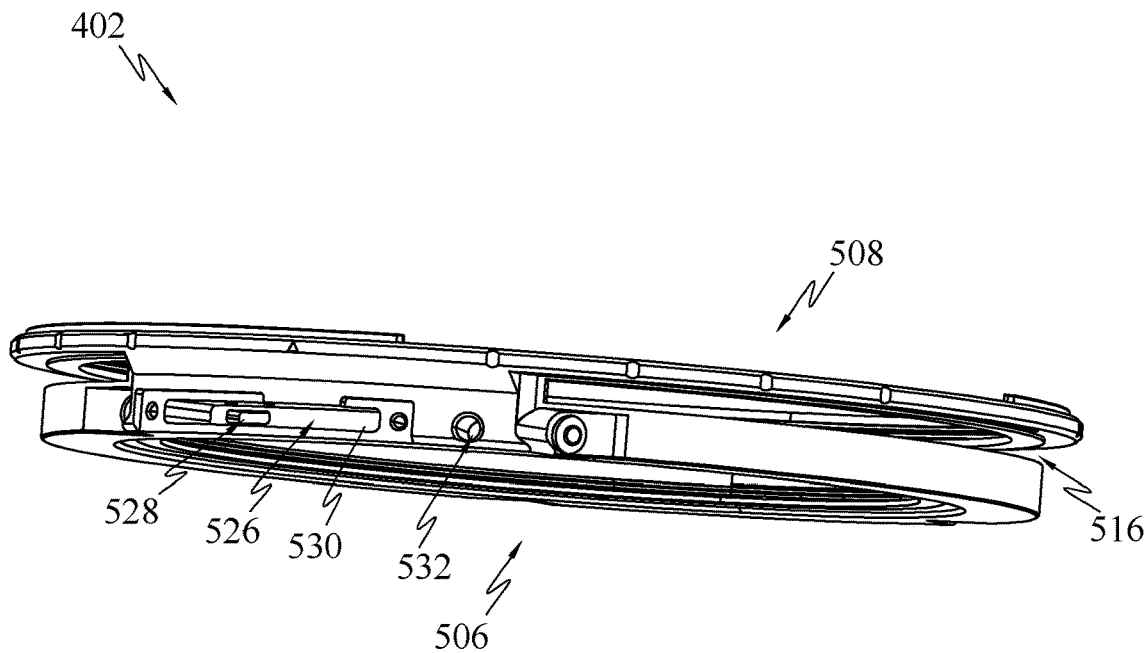
FIG. 5B illustrates a perspective view of the frame 402, in accordance with an embodiment.
Figure 5C:
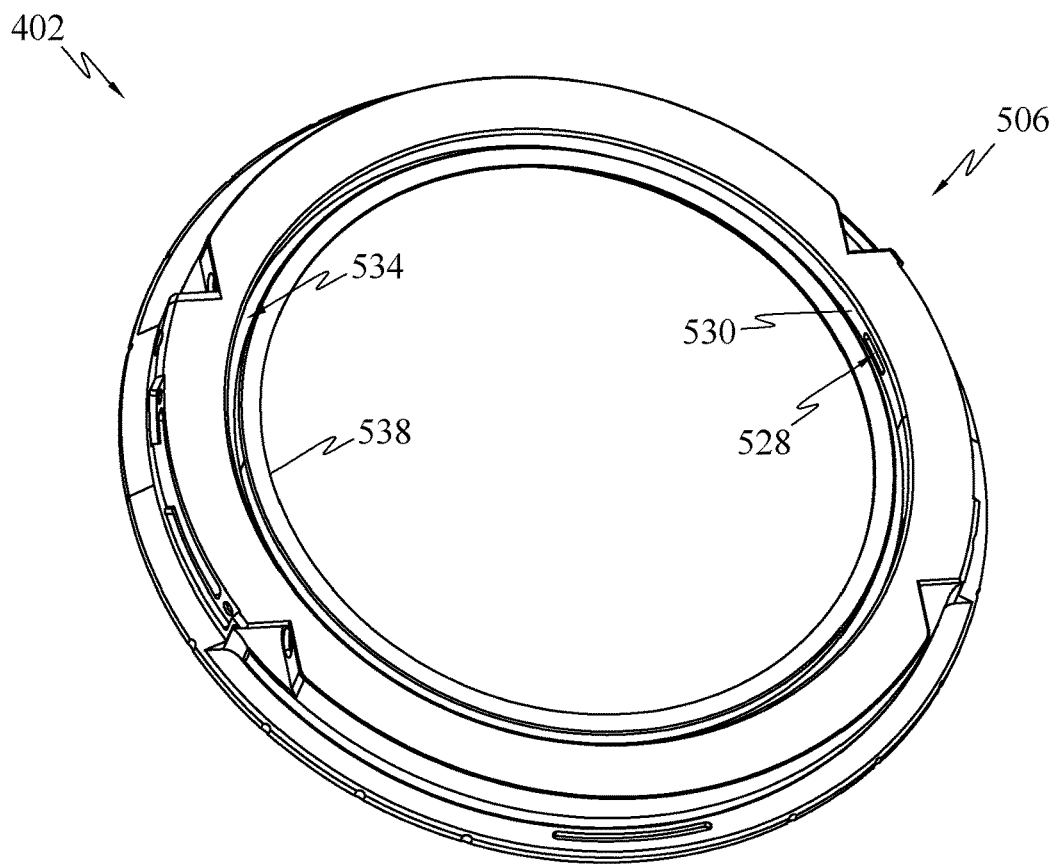
FIG. 5C illustrates a bottom perspective view of the frame 402, in accordance with an embodiment.

Referring to FIG. 5A-5C, the frame 402 is disclosed in accordance with an embodiment. The frame 402 may comprise a first filter receiving portion 502 and a second filter receiving portion 504. The first filter receiving portion 502 may be disposed towards an inferior side 506 of the frame 402. The second filter receiving portion 504 may be disposed over the first filter receiving portion 502.

In an embodiment, the first filter receiving portion 502 may be configured to receive the first filter 104. The first filter 104 may be coupled to the frame 402 via the first connecting ring 408.

In an embodiment, the first connecting ring 408 may be coupled to the first receiving portion 502 and the first filter 104 may be coupled to the first connecting ring 408 to couple the first filter 104 with the holder assembly 110.

In an embodiment, the first connecting ring 408 may comprise a plurality of first magnets to magnetically couple the first connecting ring 408 with the first filter 104.

In an embodiment, the first filter receiving portion 502 may define a first protrusion receiving portion 510 configured to receive the first protrusion 204 of the first filter 104 thereby limiting the rotation of the first filter 104 with respect to the frame 402.

In an embodiment, a first depression 512 may be defined on an inner side of the first filter receiving portion 502, wherein the first protrusion receiving portion 508 is defined within the boundary of the first depression 512 (Refer to FIG. 5A).

In an embodiment, a second depression 514 may be defined on the inner side of the first filter receiving portion 502. The second depression 514 may enable a user to easily disengage the first filter 104 from the frame 402.

In an embodiment, the second filter receiving portion 504 may be configured to receive the second filter 106 via a first slot 516 (Refer to FIG. 5B). The first slot 516 may be defined on lateral sides of the frame 402 along a direction perpendicular to a vertical axis A-A' (Refer to FIG. 4) of the frame 402. The first slot 516 may be configured to allow the second filter 106 to slide through it from one side of the first slot 516 to another side, thereby receiving at least a portion of the second filter 106 into the frame 402, thereby accommodating the second filter 106 parallel to the camera lens 120.

In an embodiment, the second filter receiving portion 504 may define a first pair of grooves 518. Each of the first pair of grooves 518 may be configured to receive a second magnet 416 (Refer FIG. 4). The second magnet 416 may be embedded within each of the first pair of grooves 518 such that a surface of the second magnet 416 may be coplanar to the surface of the second filter receiving portion 504.

In an embodiment, the second filter receiving portion 504 may define a first pair of walls 520 and a second pair of walls 522 (Refer to FIG. 5A). The first pair of walls 520 and the second pair of walls 522 may be configured to project in the vertical direction. The first pair of walls 520 may be disposed parallel to the second pair of walls 522. The first pair of walls 520 and the second pair of walls 522 may be configured to interface with at least a portion of the pair of first edges 306a and 306b of the second filter 106.

Furthermore, the second filter receiving portion 504 may define a pair of second slots 524 (Refer to FIG. 5A). Each of the second slots 524 may be defined between the first pair of walls 520 and the second pair of walls 522, respectively. Each of the second slots 524 may be configured to receive gripping member 404.

In an embodiment, the frame 402 may define a second groove 534 (Refer FIG. 5C) between the outer periphery and the inner periphery of the frame 402 towards the inferior side 506 of the frame 402, wherein the second groove 534 may be configured to receive at least a portion of the transfer ring 112.

In an embodiment, the frame 402 may define a first cavity 526 (Refer to FIG. 5B) on a lateral side of the frame 402 to receive the snapping mechanism 412. An aperture 528 (Refer to FIG. 5B) may be defined on an inner wall 530 of the first cavity 526, thereby providing access to the second groove 534 via the first cavity 526.

In an embodiment, a hole 532 (Refer to FIG. 5B) may be defined on a lateral side of the frame thereby providing access to the second groove 534. The hole 532 may be configured to receive the locking screw 414 in a way that at least a portion of the locking screw 414 may access the second groove 534.

In an embodiment, each of the gripping members 404 may be received by each of the second slots 524.

FIG. 6 illustrates the gripping member 404 of the holder assembly 110, in accordance with an embodiment. The gripping member 404 may be coupled to the frame 402. Further, a pair of reinforcing members 602 may be used to securely couple the gripping member 404 within the second slots 524 of the frame 402 using screws.

In an embodiment, each of the gripping member 404 may be shaped similar to a circular segment having a straight portion 604 and a curved portion 606 (Refer to FIG. 6). The straight portion 604 of the gripping member 404 may be rigid while the curved portion 606 of the gripping member 404 may be elastic in nature. The pair of gripping members 404 may be disposed into the pair of second slots 524 provided in the frame 402 in a way that the curved portions 606 of the each of the gripping members 404 may face each other. Also, the gripping members 404 may be placed such that the pair of first edges 306a and 306b of the second filter 106 may fit snugly between the curved portions 606 of the pair of gripping members 404.

Referring to FIGS. 7A-7B, frame 402 with black-out members 406 coupled to the frame 402 is disclosed, in accordance with an embodiment. Each of the black-out members 406 may be pivotally coupled to the frame 402 of the holder assembly 110. Each of the black-out members 406 may pivot in a way that at a first position 702, each of the black-out members 406 may cover the first slot 516 on the frame 402 (Refer FIG. 7A). At a second position 704, the black-out members 406 may provide access to the first slot 516 of the frame 402 (Refer FIG. 7B). The black-out members 406 may be employed to restrict the incidence of light on the camera lens 120 via the first slot 516, in the absence of the second filter 106 while capturing an image.

In an embodiment, each of the black-out members 406 may comprise a third magnet 706 (Refer to FIG. 7B). At the first position, each of the black-out members 406 may be magnetically coupled to the frame 402, wherein the frame 402 may comprise a ferromagnetic strip 708 (Refer FIG. 7B) that may be configured to magnetically couple with the third magnet 706. The position of ferromagnetic strip 708 on the frame 402 may correspond to the position of the third magnet 706 on the black-out member 406 such that the ferromagnetic strip 708 and the third magnet 706 may be magnetically coupled to each other when the black-out members 406 are at the first position 702 to cover the first slot 516.

FIG. 8A illustrates a snapping mechanism 412 of the holder assembly 110, in accordance with an embodiment. The snapping mechanism 412 may be configured to detachably couple the transfer ring 112 with the holder assembly 110. The snapping mechanism 412 may comprise a cover plate 802, a pressing key 804, a lever 806, a pivot arm 808, a locking member 810 and a spring 812.

In an embodiment, the cover plate 802 may be configured to cover at least a portion of the first cavity 526 of the frame 402 enclosing the snapping mechanism 412. The cover plate 802 may be provided with a pressing key slot 814 configured to receive at least a portion of the pressing key 804.

In an embodiment, the pressing key 804 may comprise a first portion 816 and a second portion 818. The pressing key 804 may be disposed in the pressing key slot 814 in such a way that the first portion 816 may be disposed outside the first cavity 526 and the second portion 818 of the pressing key 804 may be disposed inside the first cavity 526.

In an embodiment, the lever 806 may comprise a first end 820 and a second end 822 (Refer to FIG. 8A). The lever 806 may be configured to pivot about the pivot arm 808, wherein the pivot arm 808 may be disposed between the first end 820 and second end 822 of the lever 806. The first end 820 of the lever 806 may be coupled to the second portion 818 of the pressing key 804. The second end 822 of the lever 806 may be coupled to the locking member 810.

FIG. 8B illustrates the locking member 810 of the snapping mechanism 412, in accordance with an embodiment. The locking member 810 may be configured to be received within the first cavity 526. The locking member 810 may be formed by an articulating end 824, a protruding end 826 and a spring receiving portion 828. The articulating end 824 of the locking member 810 may be coupled to the second end 822 of the lever 806. The protruding end 826 may protrude through the aperture 528 into the second groove 534 of the frame 402. The protruding end 826 may be configured to interface with the transfer ring 112 when the transfer ring 112 is coupled to the holder assembly 110.

In an embodiment, the spring receiving portion 828 may be disposed adjacent to the articulating end 824 of the locking member 810. The spring receiving portion 828 may be configured to receive the spring 812. The spring 812 may be configured to assume an extended state, when the pressing key 804 is not activated, such that the protruding end 826 may protrude through the aperture 528 into the second groove 534 of the frame 402.

In an embodiment, when the pressing key 804 is activated by pressing the pressing key 804, the first end 820 of the lever 806 may articulate in a manner that the first end 820 of the lever 806 moves inwards towards center of the frame 402. The inward movement of the first end 820 of the lever 806 causes an outward movement of the second end 822 about the pivot arm 808 thereby causing the locking member 810 to move away from the center of the frame 402. The spring 812 may be compressed due to the movement of the locking member 810 when the pressing key 804 is pressed. Also, the protruding end 826 retracts from the second groove 534 of the frame 402, thereby making space for transfer ring 112 to be coupled to the holder assembly 110.

In furtherance, the releasing of the pressing key 804 may articulate the first end 820 of the lever 806 away from the center the frame 402. The outward movement of the first end 820 of the lever 806 may cause an inward movement of the locking member 810 thereby returning the spring 812 to an extended state. The inward movement of the locking member 810 causes the protruding end 826 to protrude into the second groove 534 of the frame 402 through the aperture 528, thereby engaging the protruding end 826 with a portion of the transfer ring 112 to lock the transfer ring 112 with the holder assembly 110.

FIG. 9 illustrates the transfer ring 112, in accordance with an embodiment. The transfer ring 112 may be configured to mount the holder assembly 110 onto the camera 102. A bottom side 902 of the transfer ring 112 may be configured to be detachably coupled to the camera 102. A top side 904 of the transfer ring 112 may comprise a circumferential projection 906 along the periphery of the transfer ring 112. The circumferential projection 906 may be directed towards the frame 402 of the holder assembly 110. The top side 904 of the transfer ring 112 may be configured to be detachably coupled to the frame 402 of the holder assembly 110 via the circumferential projection 906.

In an embodiment, the locking screw 414 may be disposed into the second groove 534 through the hole 532 (Refer FIG. 4 and FIG. 5B). The locking screw 414, upon receiving the circumferential projection 906 of the transfer ring 112 into the second groove 534, may be configured to interface with a portion of the circumferential projection 906 of the transfer ring 112 in a way that the locking screw 414 hold the transfer ring 414 in place, thereby detachably coupling the transfer ring 112 to the frame 402.

Referring to FIG. 10, a cross sectional view of the frame 402 and transfer ring 112 assembly is disclosed, in accordance with an embodiment. A portion of the protruding end 826 of the snapping mechanism 412 may be configured to interface with a portion of the circumferential projection 806 of the transfer ring 112 to enable the transfer ring 112 to be detachably coupled to the frame 402.

In an embodiment, the inner periphery of the frame 402 may be configured to form a connecting ring receiving platform 538 towards the inferior side 506 of the frame 402. The connecting ring 408 may be configured to be detachably coupled to the frame 402, in a way that the connecting ring 408 may be received on the connecting ring receiving platform 538 (Refer FIG. 10 and FIG. 5A).

In an embodiment, the device may further comprise adapter ring 410. The adapter ring 410 may be coupled to the frame 402 towards the superior side 508. The adapter ring 410 may be configured to receive the third filter 108.

Referring to FIG. 11, the third filter 108 is disclosed in accordance with an embodiment. The third filter 108 may have a circular configuration and may be configured to overlap at least a portion of the first filter 104 or the second filter 106 when assembled.

In an embodiment, the third filter 108 may comprise a third casing 1102 and a third filtering material 1104. The third casing 1102 may be made of a ferromagnetic material thereby enabling the third filter 108 to be magnetically coupled to the holder assembly 110.

In an embodiment, the third filter 108 may comprise a limiting structure 1106. The limiting structure 1106 may be configured to limit the rotation of the third filter 108 with respect to the frame 402. The frame 402 may be provided with a stopper 536 (Refer to FIG. 5A-5C) protruding from the superior side 508 (Refer to FIG. 5B) of the frame 402, wherein the stopper 536 may come in contact with the limiting structure 1106 of the third filter 108 to limit the rotation of the third filter 108 with respect to the frame 402.

FIGS. 12A and 12B illustrate lens cover configurations, in accordance with an embodiment. The device may comprise of first lens cover 1206 and a second lens cover 114. The second lens cover 114 may include a second circular band 1202 and a second covering element 1204. The second circular band 1202 may be configured to detachably coupled to holder assembly 110. The coupling between the second circular band 1202 and the holder assembly 110 may be either a magnetic coupling or a mechanical coupling. The second covering element 1204 may be configured to interface with an outer periphery of the second circular band 1202 and may thereby provide complete coverage for the camera lens 120 via the holder assembly 110 when the camera 102 is not in use.

In an embodiment, the first lens cover 1206 may be, but not limited to, similar to the second lens cover 114.

In an embodiment, the first lens cover 1206 may be configured to be detachably coupled to the transfer ring 112. The coupling between the first lens cover 1206 and the transfer ring 112 may be either a magnetic coupling or a mechanical coupling.

The various embodiments have been described using detailed descriptions that are provided by way of example and are not intended to limit the scope of the invention. The described embodiments comprise different features, not all of which are required in all embodiments. Some embodiments utilize only some of the features or possible combinations of the features. Many other ramification and variations are possible within the teaching of the embodiments comprising different combinations of features noted in the described embodiments.

It will be appreciated by persons skilled in the art that the various embodiments are not limited by what has been particularly shown and described herein above. Rather the scope of the invention is defined by the claims that follow.

What is claimed is:

1. A filter mounting device for a camera, the device comprises:
    a first filter, wherein the periphery of the first filter has a circular configuration;
    a second filter, wherein the periphery of the second filter comprises a pair of first edges that are parallel to each other; and
    a holder assembly comprising:
        a frame, wherein the frame comprises:
            a first filter receiving portion configured to receive the first filter; and
            a second filter receiving portion configured to receive the second filter;
            wherein the second filter is received by the second filter receiving portion via a first slot defined on the frame along a direction perpendicular to a vertical axis of the frame.

2. The device of claim 1, wherein the first filter receiving portion is disposed towards an inferior side of the frame and the second filter receiving portion is disposed towards a superior side of the frame.

3. The device of claim 2, wherein:
    the first filter comprises a first protrusion protruding in a lateral direction; and
    the first filter receiving portion of the frame defines a first protrusion receiving portion configured to receive the first protrusion of the first filter thereby limiting the rotation of the first filter with respect to the frame.

4. The device of claim 2, wherein the holder assembly comprises:

a first connecting ring comprising a plurality of first magnets, wherein the first connecting ring is engaged to the first filter receiving portion and configured to interface with the first filter.

5. The device of claim 2, wherein the second filter receiving portion defines a first pair of grooves, wherein each of the grooves is configured to receive a second magnet.

6. The device of claim 2, wherein the second filter receiving portion defines a first pair of walls and a second pair of walls projecting in a vertical direction, wherein the first pair of walls and the second pair of walls are parallel to each other and configured to receive the pair of first edges of the second filter.

7. The device of claim 6, wherein the second filter receiving portion defines a pair of second slots, wherein each of the second slot is defined between the first pair of walls and the second pair of walls respectively.

8. The device of claim 7, wherein the holder assembly comprises:
a pair of gripping members, wherein each of the pair of gripping members is received in each of the second slots respectively and configured to interface with each of the pair of first edges of the second filter.

9. The device of claim 2, wherein the holder assembly comprises:
a pair of black-out members, wherein each of the black-out members is pivotally coupled to the frame, wherein:
at a first position, each of the black-out members is configured to cover the first slot on the frame; and
at a second position, each of the black-out members is configured to provide access to the first slot on the frame.

10. The device of claim 9, wherein each of the black-out members comprises a third magnet, wherein at the first position, each of the black-out members is magnetically coupled to the frame to cover the first slot on the frame.

11. The device of claim 2, wherein the device comprises:
a transfer ring, wherein the transfer ring is detachably coupled to the camera at a bottom side and detachably coupled to the frame of the holder assembly at a top side.

12. The device of claim 11, wherein a second groove is defined between the outer periphery and the inner periphery of the frame towards the inferior side of the frame, wherein the second groove is configured to receive at least a portion of the transfer ring.

13. The device of claim 12, wherein the holder assembly comprises:
a snapping mechanism configured to detachably couple the transfer ring with the frame of the holder assembly.

14. The device of claim 13, wherein:
a first cavity is defined on a lateral side of the frame to receive the snapping mechanism; and an aperture in defined on an inner wall of the first cavity, thereby providing access to the second groove via the first cavity.

15. The device of claim 13, wherein the snapping mechanism comprises:
a cover plate configured to cover at least a portion of the first cavity enclosing the snapping mechanism;
a pressing key, wherein the pressing key comprises a first portion disposed outside the first cavity and a second portion disposed inside the first cavity;
a lever comprising a first end and a second end, wherein:
the lever is pivoted between the first end and the second end using a pivot arm; and
the first end of the lever is coupled to the second portion of the pressing key;
a locking member coupled to the second end of the lever, wherein at least a portion of the locking member is configured to protrude through the aperture into the second groove; and
a spring coupled between the locking member and the cover plate;
wherein, the activation of the pressing key causes the articulation of at least a portion of the locking member in and out of the second groove thereby detachably coupling the transfer ring with the frame.

16. The device of claim 12, wherein:
a hole is defined on a lateral side of the frame, thereby providing access to the second groove of the frame; and
the holder assembly comprises:
a locking screw configured to be received by the hole defined on the frame, wherein the locking screw is configured to mechanically couple the transfer ring with the frame.

17. The device of claim 1, wherein the device comprises:
an adapter ring coupled to the frame on the superior side; and
a third filter configured to engage with the adapter ring.

18. The device of claim 11 comprises:
a first lens cover configured to be detachably coupled to the transfer ring; and
a second lens cover configured to be detachable coupled to the holder assembly.

19. The device of claim 18, wherein:
the first lens cover comprises:
a first circular band configured to detachably couple to the transfer ring; and
a first covering element configured to interface with an outer periphery of the first circular band; and
the second lens cover comprises:
a second circular band configured to detachably couple to holder assembly; and
a second covering element configured to interface with an outer periphery of the second circular band.

* * * * *